March 15, 1960 C. H. BERGSLAND ET AL 2,928,093

ASSEMBLING MACHINE FOR CIRCUIT COMPONENTS

Filed Dec. 28, 1954 3 Sheets-Sheet 1

INVENTORS
CHARLES H. BERGSLAND
ROBERT S. HEDIN
BY William C. Stueber
ATTORNEY

March 15, 1960 C. H. BERGSLAND ET AL 2,928,093

ASSEMBLING MACHINE FOR CIRCUIT COMPONENTS

Filed Dec. 28, 1954 3 Sheets-Sheet 2

INVENTORS
CHARLES H. BERGSLAND
ROBERT S. HEDIN
BY William C. Stueber
ATTORNEY

ASSEMBLING MACHINE FOR CIRCUIT COMPONENTS

Filed Dec. 28, 1954 3 Sheets-Sheet 3

INVENTORS
CHARLES H. BERGSLAND
ROBERT S. HEDIN
BY William C. Stueber
ATTORNEY

United States Patent Office 2,928,093 Patented Mar. 15, 1960

2,928,093

ASSEMBLING MACHINE FOR CIRCUIT COMPONENTS

Charles H. Bergsland, Stillwater, Minn., and Robert S. Hedin, Post Falls, Idaho, assignors to General Mills, Inc., a corporation of Delaware Application December 28, 1954, Serial No. 478,052

3 Claims. (Cl. 1—2)

This invention relates to improvements in automatic machines for assembling, mounting or attaching electrical components to circuit boards and more specifically to machines for attaching components such as resistors, condensers, transistors, coils and the like to boards containing printed circuits.

In manufacturing, the use of completely automatic equipment has been receiving increasing emphasis, and the demand is increasing for equipment which will erect or assemble a product with a minimum or complete absence of human attention. The human element is thus eliminated and greater standardization, lower labor costs, reduced error, long continued operating periods, and many other advantages are obtained. Reduced cost is, of course, of prime importance and the high speed continuous operation of a completely automatic machine soon permits it to amortize the original costs of research and design.

The present invention is concerned with automation in the electrical field. Advances in the printed circuit art have reduced the cost of electrical equipment and have made new improvements possible in presenting such new features as reduction of space requirements. Printed circuits generally have the form of a network of circuits of a suitable metal embedded or attached to the surface of an insulating board. Tube sockets and components are mounted on the circuit board to complete the circuits which are printed thereon. Components such as resistors, condensers, transistors and the like are often mounted on the circuit boards with their leads pressed against and soldered to the end of a lead in the printed circuit. When the numerous and varied components are attached, the circuit board becomes the completed electrical instrument or a component of a larger instrument. Reduction of the cost of attaching the components will be of benefit to all fields of electrical endeavor where electrical devices such as radio, television, scientific instruments, industrial instruments, etc. are used.

It is accordingly an object of the present invention to furnish a machine which will automatically receive an electrical component and mount and attach the component on a circuit board of the type having predetermined circuit connections.

Another object is to provide an automatic machine for mounting electrical components on a circuit board which will readily adapt itself to components of many and varied types without alterations.

A more detailed object of the invention is to provide an automatic component mounting machine which will automatically feed a series of components, bend their lead wires at right angles to their bodies, and insert the lead wires in holes in a printed circuit board.

A further object is to provide a machine which will crimp the lead wires of a component mounted on a circuit board to press the wires against the conducting circuit ends and secure the component on the board.

Other objects and advantages will become more apparent in the following specification in connection with the appended drawings in which Figure 1 is a front elevational view of the component attaching machine;

The mechanism shown, which illustrates the preferred embodiment of the present invention, receives a supply of electrical components such as condensers, transistors, coils, resistors, etc., and attaches them to a surface such as a printed circuit board. The electrical components are received as they are obtained from the factory, usually with the electrical leads projecting from each end parallel to the axis of the component. It may be necessary in some instances to cut the leads to the proper length and they must be straight.

In the present drawings, the components are shown for the purpose of illustration as being resistors. The resistor supply 12 is stacked on a supply chute 14, Fig. 2, which is inclined so that the resistors will tend to roll down the chute and feed toward the machine as each succeeding resistor is taken from the lower end of the chute.

Figure 1:
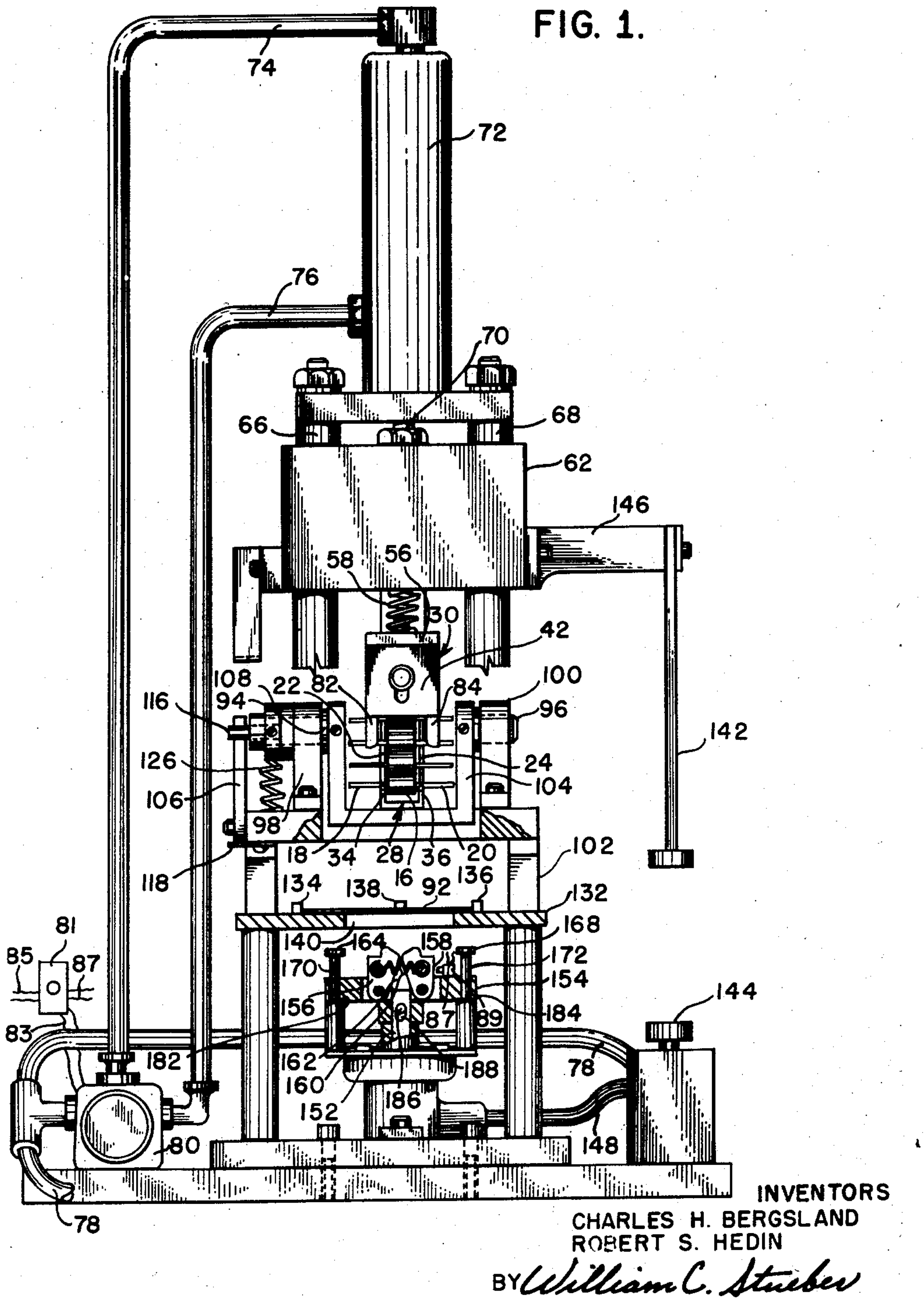

As illustrated in Fig. 1, each resistor comprises a body portion 16 and leads 18 and 20. The chute includes a pair of parallel rails 22 and 24 which are spaced slightly wider than the length of the body 16 of the resistors so that the resistors rest on their leads. The resistors are prevented from sliding downwardly on the chute by the resistor 26 which has slid off the chute and rests on notched sides 34 and 36 of the anvil 28 (see Figs. 2 and 3).

When this resistor 26 is later being carried downwardly to be attached to the circuit board, the back face of the inserter head 30 slides past the end resistor 32 in the chute and prevents the supply of resistors from sliding downwardly as will be later discussed in more detail. After the present resistor has been attached to the circuit board and the inserting head is again raised, the next resistor 32 will be permitted to slide into place on the anvil 28 in the place of resistor 26. The anvil 28 has a pair of sides or supports 34 and 36 which are spaced apart the same distance as the rails of the supply chute so that the resistors slide off the chute to rest on the anvil supports on their leads. Each of the supports 34 and 36 is provided with a notch 38 which cradles the resistor lead and prevents the resistor from sliding forward out of the anvil.

Figures 7, 8, 9:
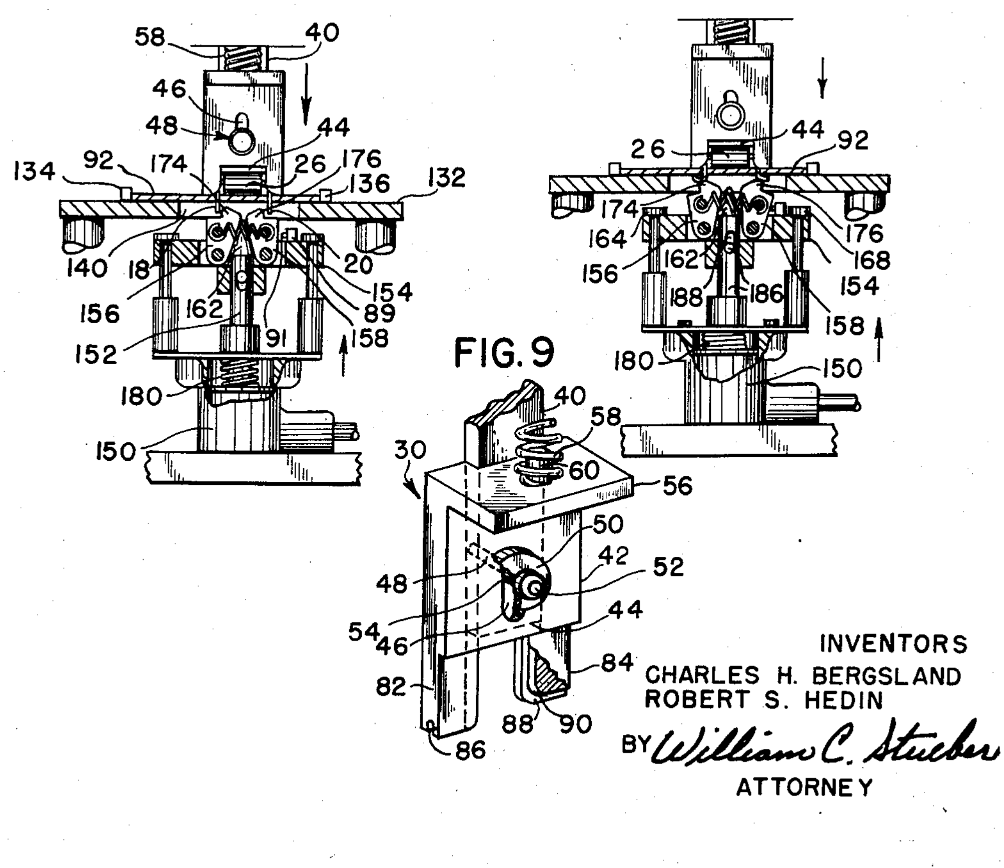
Fig. 7 is a front elevational view of the inserter head and the lead crimping mechanism.
Fig. 8 is a front elevational view of the mechanism of Fig. 7 illustrating the lead crimping mechanism in operation.
Fig. 9 is a detailed enlarged perspective view of the inserter head.

The anvil 28 supports the resistor until its leads 18 and 20 have been bent downwardly at right angles to the axis of the resistor. Although the leads 18 and 20 may be of any desirable length, they are preferably cut to a length, either in manufacture or before placing on the supply chute, which will adequately reach through the circuit board and yet will not be awkwardly long for crimping over on the back side of the circuit board as is illustrated in Fig. 8.

Figures 2, 3, 4:
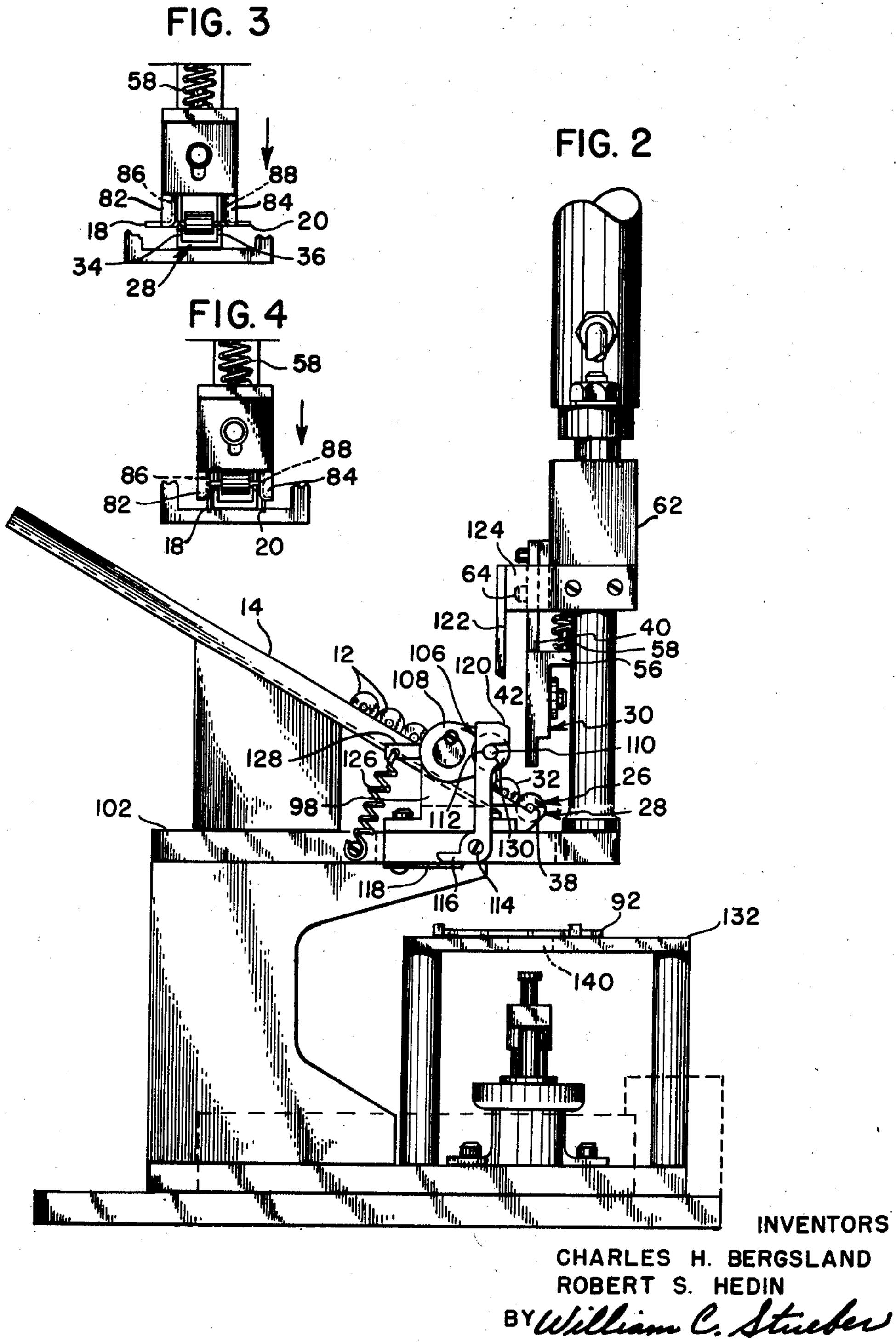
Fig. 2 is a side elevational view of the attaching machine.
Fig. 3 is a detailed front elevational view of the inserter head shown just before the wire leads of the electrical component are bent.
Fig. 4 is a front elevational view of the mechanism of Fig. 3 showing the position of the inserter head after the wire leads have been bent.

The inserter head functions both to bend the leads of the resistor downwardly and to insert them into holes on the circuit board. The inserter head 30, as is illustrated in Figs. 1 and 2 and as is shown in detail in Fig. 9, consists of a guide bar 40 and a lead forming inserter block 42 which is slidably mounted on the guide bar. The base 44 of the guide bar is flat when viewed toward its bottom surface and this surface acts as a pusher to push the resistor against the circuit board when the leads are inserted.

The inserter block 42 which slides on the guide bar has a vertically elongated slot 46 in its front face. A limit pin 48 is threaded into the guide bar 40 and extends through this slot to limit the vertical movement of the inserter block. The pin 48 carries a washer 50 held on the pin by nut 52 to hold the inserter block on the guide 40. To prevent the washer 50 from binding the inserter block a sleeve 54 is placed over the pin. The sleeve is of a length slightly longer than the thickness of the metal surrounding the slot 46 so that the washer cannot be forced tightly against the inserter block by the nut 52.

The upper end of the inserter block has a projecting bracket portion 56 against which abuts a compression spring 58 for forcing the inserter block 42 downwardly on the guide 40. A boss 60 projects upwardly from the bracket 56 to hold the spring 58 in place. The upper end of the spring projects against the lower face of a yoke 62, Figs. 1 and 2.

The yoke 62 carries the inserter head assembly including the guide bar 40 and the inserter block 42. The guide bar 40 is securely bolted to the rear side of the yoke by bolts 64, Fig. 2.

The yoke moves up and down on a pair of guide posts 66 and 68, Fig. 1. To give the yoke its vertical movement a rod 70 connected to the piston of an air cylinder 72 is attached to the upper end of the yoke.

The air cylinder 72 is of a conventional type and encloses a piston, not shown, which moves up and down as air is admitted into either end of the cylinder. For this purpose an air line 74 connects to the upper end of the cylinder, and air line 76 connects to the lower end. When air is admitted into the lower end through the line 76, the line 74 is vented to atmosphere and the piston will move to the top of the cylinder, thus raising the yoke 62 to the top of its guide posts 66 and 68.

To lower the yoke, air is admitted to the top of the cylinder through line 74 and line 76 is vented to atmosphere.

The supply of air for these lines is obtained from the supply line 78 which connects to a two position four-way valve 80. In one position, this valve will connect line 74 to the air pressure supply line 78 and will vent line 76 to atmosphere. In the other position the valve will serve to connect line 76 to the supply line 78 and vent line 74 to atmosphere. The control for this valve is not shown in detail but may be of the conventional type operated either manually or as in the case of the present embodiment shown by an electrically controlled solenoid which is part of the valve 80. The solenoid is controlled by a switch 81 connected to the solenoid by leads 83. Electricity is supplied through leads 85 from a suitable source. Another circuit may be arranged to be completed to the solenoid by leads 87 connecting to a switch 89 which is actuated to return the valve to its original position as will later be explained.

Instead of providing the manual switch 81, a switch operates the solenoid and may be arranged to operate automatically to lower the inserting head when a circuit board is in position. As illustrated the machine is operated by actuating the switch 81 which operates the solenoid valve 80 to admit air into the top of the cylinder 72. In the down stroke of the yoke 62, the inserter head 30 is carried downwardly. In the first part of the stroke it bends the leads of the resistor and at the end of the stroke inserts the leads into holes in the circuit board. It also functions to automatically actuate a crimping mechanism which bends over the ends of the leads projecting through the circuit board to securely attach the component to the board and to press the leads into close contact with the circuitry on the board.

For bending the leads of the resistor and for supporting the resistor when it is carried downwardly to the circuit board, a pair of lead bending fingers 82 and 84 project downwardly from the inserter block. These fingers, as may be seen in detail in Fig. 9, are provided with grooves 86 and 88 which extend across their bottom surfaces and up along their inner faces. The horizontal and the vertical portions of the grooves meet at a slight curvature 90 for facilitating the bending of the leads. These grooves are vertically aligned with the lower face 44 of the guide bar 40 so that when the resistor is in place with the bent leads wedged in the grooves, the body of the component will be butted against the lower face 44 of the guide bar.

When the yoke descends and carries the inserter head with it, the lead bending fingers 82 and 84 first engage the leads, as is shown in Fig. 3, with the grooves in the fingers straddling the leads and as the fingers continue moving downwardly the leads bend sliding in the grooves. The lead bending fingers are so spaced that they will pass just outside of the supporting elements 34 and 36 of the anvil 28.

The anvil is locked in the position shown in Figs. 3 and 4 so that when the inserter head continues to descend, the leads 18 and 20 will be bent downwardly to the position of Fig. 4.

The spring 58 has sufficient strength to prevent the inserter block from sliding upwardly on the guide from the resistance of the leads and it remains in the downward position while the leads are being bent as is shown in Fig. 4.

When the leads have been bent and the inserter head has moved down to the position shown in Fig. 4, it continues its downward travel to carry the resistor down to the circuit board 92. The anvil, however, must be moved out of the way to permit the inserter head to pass as it moves downward in a straight line. The anvil, as illustrated in Figs. 1, 2, 5, and 6, is supported on a pivotally mounted carriage. The carriage is pivotally suspended on trunnions 94 and 96. The trunnions are journalled in supports 98 and 100 which are carried on the frame 102 of the machine. The anvil 28 is supported from the trunnions 94 and 96 by means of a U-shaped cradle or carriage 104 which extends downwardly from the trunnions and projects forwardly to hold the anvil beneath the inserter head. Thus mounted, the anvil is capable of swinging rearwardly away from the inserter head to the position shown in Fig. 6.

The anvil carriage which supports the anvil is locked in position by a locking arm 106, Fig. 2 while the resistor leads are being bent. To lock the anvil carriage in the position shown in Fig. 2, a crank arm 108 is mounted to rotate with the anvil carriage and has a laterally projecting pin 110 which seats in a locking notch 112 on the locking arm 106. The locking arm 106 is in the form of a bell crank being pivoted at 114 with the lower arm 116 of the bell crank being engaged by a leaf spring 118 which tends to hold the arm 106 in locking position.

The upper portion of the locking arm 106 has a cam surface 120 which is engaged by a release and actuator arm 122 which functions both to unlock the anvil carriage and to pivotally push it out of the way of the descending inserter head.

Figure 5:
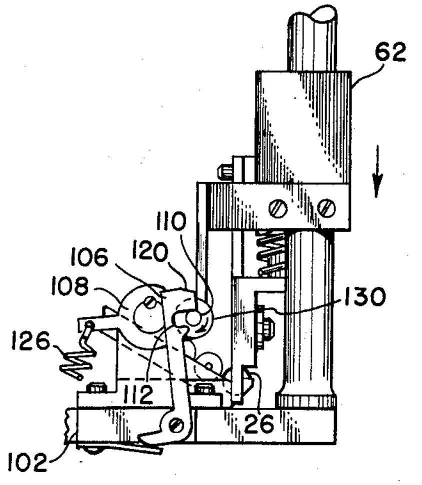
Fig. 5 is a detailed side elevational view of the inserter head and associated mechanism illustrating the component supporting anvil as it is being unlocked.

This actuator arm 122 is secured to the yoke 62 by means of a bracket 124. When the yoke 62 descends, the lower end of the actuator arm 122 first strikes the cam surface 120 of the locking arm 106. This pivots the arm 106 counterclockwise as is shown in Fig. 5 so that the pin 110 of the crank arm 108 is freed by moving out of the notch 112.

The anvil carriage, although it projects forwardly from the supporting trunnions 94 and 96, will not swing downwardly by itself when it is released since a counterbalancing spring 126 tends to pivot the anvil carriage in the opposite direction. The counterbalancing spring is a spiral tension spring connected between the frame 102 and a projection 128 extending from the rear of the crank arm 108.

When the anvil carriage is unlocked, it is pivoted downwardly against the action of the spring 126 by the actuator arm 122 which has also functioned to trip the locking arm 106. The actuator 122 is sufficiently wide to engage the arm 106 and also engage a roller 130 which is rotatably mounted on the end of the crank arm 108, Figs. 5 and 6, so as to be coaxial with the locking pin 110.

Figure 6:
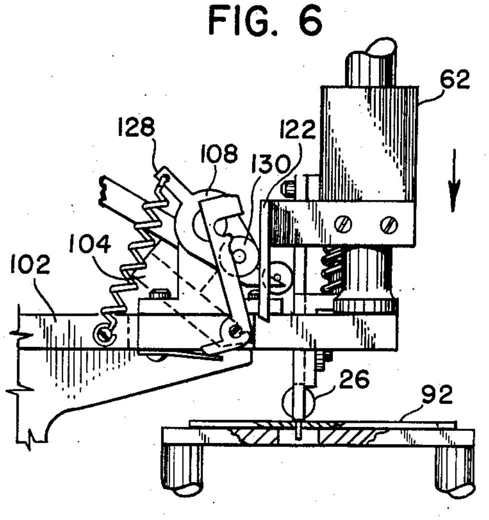
Fig. 6 is a side elevational view of the component inserter head and associated mechanism shown in position as the leads of the component are inserted into the circuit board.

As is illustrated in Fig. 6, when the yoke 62 and the inserter head 30 continue to descend, the anvil carriage pivots rearwardly to carry the anvil out of the way of the descending inserter head. The anvil is held out of the path of the inserter head by the flat face of the actuator arm 122 which continues in engagement with the roller 130 to hold the carriage in the position shown in Fig. 6.

It is to be noted that there is no support for the resistor 26 other than the lead bending fingers 82 and 84. The bent leads are wedged between the fingers, being held snugly in the grooves 86 and 88.

We have found that a critical tolerance must be maintained in the size relationship between the size of resistor and leads, the size of the grooves, and the width between the lead bending fingers to properly bend the leads and to support the resistor so that it will not fall from between the fingers while the resistor is being carried down to the circuit board.

With the resistor wedged between the lead bending fingers, the inserter head is carried downwardly and the bent leads 18 and 20, Fig. 7, enter holes in the circuit board 92. The circuit board is so positioned on the table 132 that the holes in the circuit board are in the proper position so that the leads will enter the holes. The circuit board may be held in place such as by guides 134, 136, and 138. The table 132 is fixed in elevation with respect to the machine and it may be stationary on the device or may be part of a conveyor system which carries a successive number of circuit boards through the machine. The table 132 is provided with an opening 140 in the center which corresponds to the lower position of the inserter head so that the resistor leads are free to pass through the circuit board to project from the other side and so that the crimping mechanism may move up through the opening in the table to crimp the projecting leads.

When the yoke 62 approaches the limit of its downward travel, the lead bending fingers first engage the circuit board 92. Continued downward movement by the yoke 62 tends to compress the spring 58 and although the inserter block stops, the guide 40 continues to travel downwardly between the fingers 86 and 88. This is shown in Fig. 7 where the pin 48 has moved to the lower portion of the slot 46.

This moves the base 44 of the guide bar 40 downwardly between the inserter fingers to shove the resistor out from between the inserter fingers to push the leads of the resistor through the circuit board.

When the fingers 86 and 88 first engage the circuit board, the leads are in line with the holes in the circuit board and therefore continued downward movement of the guide 40 pushes the resistor body downwardly to push the leads through the circuit board. This succession of steps is shown in Figs. 6 and 7.

When the leads 18 and 20 project through the circuit board 92, they are crimped over to firmly secure the resistor 26 to the board, as will be described particularly in connection with Figs. 7 and 8.

The first action in operating the crimping mechanism occurs when the inserter head engages the circuit board and the guide bar continues to move downwardly to push the component tightly against the board. This brings an arm 142, shown in Fig. 1, against a plunger 144 of an air valve. The arm 142 is carried on a bracket 146 projecting from the yoke 62. Depressing the plunger 144 admits air from the air supply line 78 to line 148 beneath the piston 150, as illustrated in Fig. 7. The rod 152 of this piston extends upwardly to carry the crimping platform 154 upwardly and to spread the crimping fingers 156 and 158.

These crimping fingers are pivotally mounted on the elevator platform 154 to project upwardly. The fingers are held together by a tension spring 160. The upper end of the piston rod 152 has a tapered head 162 which is wedged between the crimping fingers. The tension of the spring 160 is such that the head 162 cannot force itself between the fingers as long as the platform 154 moves upwardly and thus the piston rod 150 carries the elevator platform 154 upwardly in the first part of its stroke.

The elevator platform, however, has a limited rise, being stopped by heads 164 and 168 on the guide rods 170 and 172. These guide rods extend upwardly through holes in the elevator platform and guide the vertical movement of the platform.

When air has been admitted beneath the piston 150 and the rod 152 has carried the elevator platform 154 upwardly, the crimping fingers 156 and 158 are located between the leads 18 and 20 which now project through the circuit board 92. The fingers 156 and 158 have rounded tips 174 and 176 which engage the leads to crimp them.

The crimping action is illustrated in Fig. 8 and this occurs when the elevator platform 154 has struck the stops 164 and 168 and the piston rod 152 continues to move upwardly. This causes the tapered head 162 to force itself between the pivotal crimping fingers 156 and 158 forcing them apart. As they move apart, the rounded ends 174 and 176 bend the ends of the leads 18 and 20 outwardly. This holds the resistor 26 tightly to the board and tends to force the leads up tightly against the conductive part of the printed circuit which may be on the lower surface of the circuit board 92.

This action completes the attaching of the resistor to the circuit board. The leads of the resistor have been bent and inserted into the circuit board and crimped on the reverse side of the board.

It is to be noted that as the crimping finger 158, Figs. 7 and 8, is spread or moves to the right, it depresses the plunger 91 on the switch 89 which is mounted on the platform 154. This completes a circuit through leads 87 and 83 back to the solenoid valve 80, returning it to its original position. In this position, air line 74 is vented to atmosphere and air line 76 is pressurized, causing the piston in the cylinder 72 to be raised to the top of its stroke. This returns the inserting head to its original position of Figs. 1 and 2 where it is ready to be operated for another cycle to insert a new resistor into new holes on the circuit board or into a new circuit board.

As the yoke 62 is automatically raised by the action of the valve 80, admitting air to the lower part of the air cylinder 72 through the air line 76, it releases the plunger 144 on the two-way valve and vents line 148 to atmosphere. The crimping piston 150 then drops by the action of a compression spring 180 which is above it and which forces it downwardly and drops the elevator platform 154.

The fingers 156 and 158 may remain spread during the dropping of the platform but when the platform drops to its lowermost position as shown in Fig. 1, it strikes shoulders 182 and 184 on the guide rods 170 and 172, stopping its downward travel. The piston rod 52 continues its downward travel, however, and withdraws the tapered head 162 from between the crimping fingers, permitting them to be pulled together by the spring 160.

The travel of the piston rod 152 relative to the elevator platform 154 is limited by a pin 186 secured to a portion of the platform and projecting through a slot 188 in the piston rod. At the uppermost position of the elevator platform 154, the piston rod cannot move upwardly any farther than is necessary to spread the fingers to crimping position as is shown in Fig. 8. In the lowermost position, the piston rod will not drop any lower than is necessary to permit the crimping fingers to move together.

Returning to the upward movement of the yoke after the resistor has been attached, when the yoke 62 reaches its uppermost position as is shown in Fig. 1, the guide 40 moves above the leading resistor 32 on the chute and permits it to slide forwardly. The upward movement of the yoke has also carried the actuator 122 above the roller 130 so that the spring 126 can return the anvil carriage to the position shown in Fig. 1. The locking arm 106, of course, snaps back over the pin 110 to lock the anvil in its return position.

With the anvil in this position, the resistor 32 will drop down on the anvil members 34 and 36 and into the notches. With the new resistor in place the machine is ready for another bending and inserting operation. A new circuit board will be moved into position for this purpose or in some instances the position of the circuit board will be changed to bring a new set of holes beneath the inserting head.

It will thus be seen that the present machine has, in a series of simple steps, taken a resistor substantially as it is furnished by the manufacturer and attached it to a printed circuit board. In actual operation, the machine can obtain a high rate of speed with the inserting head descending in a fraction of a second and reascending to receive a new resistor. If desired, a plurality of mechanisms similar to the one shown in the present preferred embodiment can be assembled along a conveyor line with each one handling resistors of different sizes or handling various other components to complete a circuit board in one traverse through the machine.

It will be seen that the attaching mechanism is rugged in structure and suitable to high-speed operation without the necessity of frequent attention or repair. The machines will continue to operate with a minimum of attention providing the supply chute is filled with resistors or other electrical components. The components are securely attached both physically and electrically to the circuit board and when attached may be further processed by dipping in solder in accordance with operations known to the printed circuit art.

The device is suitable to handling components of varying types without major adjustment. It is especially well adapted to high speed production use and will not fail or jam with minor defects in the components. It will handle components such as resistors when the lead wires are not perfectly straight. The components are firmly gripped when the inserter head descends, yet they are handled gently to prevent damage thereto.

We have, in the drawings and specification, presented a detailed disclosure of the preferred embodiment of our invention. It is to be understood that the invention is susceptible of modifications, structural changes and various applications of use within the spirit and scope of the invention and we do not intend to limit the invention to the specific form disclosed but intend to cover all modifications, changes and alternative constructions and methods falling within the scope of the principles taught by our invention.

We claim as our invention:

1. A machine for mounting electrical components on a circuit board which comprises an anvil having projecting fingers spaced apart a distance greater than the component body length for supporting individual components by their leads while the leads are being bent, lead bending members movable with respect to the anvil to bend the leads while the component is being supported by the anvil, means to move the lead bending members past the anvil, pivotal support members for the anvil to permit it to pivot out of the path of the lead bending members, latching means for locking the pivotally supported anvil, an anvil pivoting arm projecting to be operable to pivot the anvil to a non-interfering position, an unlatching arm carried with the lead bending members and positioned to engage the latching means to release the anvil immediately after the leads of the components are bent and anvil operating means positioned to engage said anvil pivoting arm simultaneously with the unlatching of the anvil to cause the anvil to pivot out of the path of the lead bending members.

2. A machine for mounting electrical components on a circuit board which comprises a sloping supply chute carrying the supply of components gravitationally fed, an anvil member for receiving individual electrical components from the chute, a bending member movable past the anvil to bend the component leads and carry the component to a circuit board, means for moving the anvil out of the path of the bending member after the component leads have been bent, an inserting member formed of an elongated plate with an inserting surface on the end, the bending member being slidably mounted thereon to retract when the component is in inserting position to permit the inserting member to push it into the board, the inserting member positioned to move in front of the foremost component on the supply chute, and means to move the inserter in a linear path toward the circuit board and return to prevent the components from feeding downwardly while the inserting member is moving to the circuit board to permit a component to move onto the anvil when the bending and attaching member has completed the attaching of the component to the circuit board and the inserting member has returned for a succeeding operation.

3. A machine for mounting electrical components on a circuit board which comprises an anvil member having fingers spaced apart a distance greater than the length of the component body for holding an electrical component by the leads while the leads are being bent at an angle to the body of the component for purposes of entering openings in the circuit board, a lead bending block having fingers projecting downwardly therefrom and having a channel extending through the block positioned directly between the fingers, an inserter head adapted to engage the component and force it against a circuit board to insert the component leads into holes in the circuit board, the inserter head positioned in said channel directly between said fingers of the bending block and slidable relative thereto, spring means biasing the lead bending block toward an extended position with respect to the inserter head, means to limit the movement of the lead bending block with respect to the inserter head, means to carry the inserter head and lead bending member past the anvil to bend the leads thereagainst, means to move the anvil out of the path of said members, and means to support a circuit board in the path of said members, the lead bending fingers engaging the circuit board and halting the movement of the lead bending block while said spring permits the continued travel of the inserter head to force the leads into the holes in the circuit board.

References Cited in the file of this patent

UNITED STATES PATENTS

| | | |
|---|---|---|
| 822,348 | Cobb | June 5, 1906 |
| 1,169,339 | Maynard | Jan. 25, 1916 |
| 1,171,729 | Kohnle | Feb. 15, 1916 |
| 1,264,901 | Craig | May 7, 1918 |
| 1,557,317 | Nolan | Oct. 13, 1925 |
| 1,583,935 | Leschhorn | May 11, 1926 |
| 1,859,951 | Blevney | May 24, 1932 |
| 2,180,484 | Sims | Nov. 21, 1939 |
| 2,186,569 | Bacon | Jan. 9, 1940 |
| 2,314,184 | Zeruneith | Mar. 16, 1943 |
| 2,617,098 | Lenart | Nov. 11, 1952 |
| 2,704,844 | Mackechnie | Mar. 29, 1955 |